Sept. 2, 1958     R. A. WHITE     2,850,702
MEASURING APPARATUS
Filed Sept. 15, 1954

INVENTOR
RICHARD A. WHITE
BY
George Sipkin
J. R. Heintzen
ATTORNEY

United States Patent Office 2,850,702
Patented Sept. 2, 1958

2,850,702

MEASURING APPARATUS

Richard A. White, Horseheads, N. Y., assignor, by mesne assignments, to the United States of America as represented by the Secretary of the Navy Application September 15, 1954, Serial No. 456,349

2 Claims. (Cl. 333—22)

This invention relates to measuring apparatus and more particularly to apparatus for determining the amount of high frequency electromagnetic energy flowing through a transmission element.

Since the early days of radio transmission, operating personnel have experienced difficulty in accurately measuring the amount of radio frequency power carried by transmission elements such as transmission lines, antennas, and the like. As the frequencies at which the energy was being utilized increased, the difficulties in obtaining accurate measurements of radio frequency power also increased.

Modern techniques have developed new measuring equipment and have improved older equipment for measuring power in the lower radio frequencies, but the measurement of power in the very- and ultra-high frequencies still lacks the desired accuracy. Various devices such as bolometers, crystal detectors and lossy loads have been developed to provide indications of the amount of power flowing through wave guides, but the difficulties still persist. A bolometer absorbs only a portion of the power in a wave guide, making it difficult to calibrate the bolometer so that the proportion of power absorbed is accurately known, and is difficult to properly match to the wave guide. Crystal detectors convert only a portion of the high frequency energy to direct current which can be measured; the rest is lost as heat in the crystal and associated circuitry. The use of lossy materials to convert at least a portion of the high frequency energy into heat which can be measured as an indication of the high frequency power to which the materials have been exposed has gained popularity, but still the problems of mismatch between the lossy material and the wave guide, loss by radiation from a large body of lossy material of a portion of the generated heat, and the loss of another portion of the generated heat by conduction through the wave guide with which at least a portion of the lossy material is commonly in contact, contribute to inaccurate measurements.

It is an object of this invention to provide a novel and improved means for indicating the amount of high frequency electromagnetic energy flowing in transmission elements.

Another object of this invention is to provide a novel and improved apparatus for indicating the amount of high frequency electromagnetic power flowing in a wave guide.

A further object of this invention is to provide a novel and improved calorimeter element load for dissipating a predetermined proportion of the electromagnetic energy flowing in a wave guide, whereby the amount of power in the wave guide may be determined.

Other objects and advantages of the invention will hereinafter become more fully apparent from the following description of the annexed drawings, which illustrate a preferred embodiment, and wherein.

Figure 3:
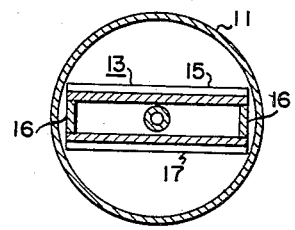
Fig. 3 is a sectional view on the line 3—3 of Fig. 2.
Figure 1:
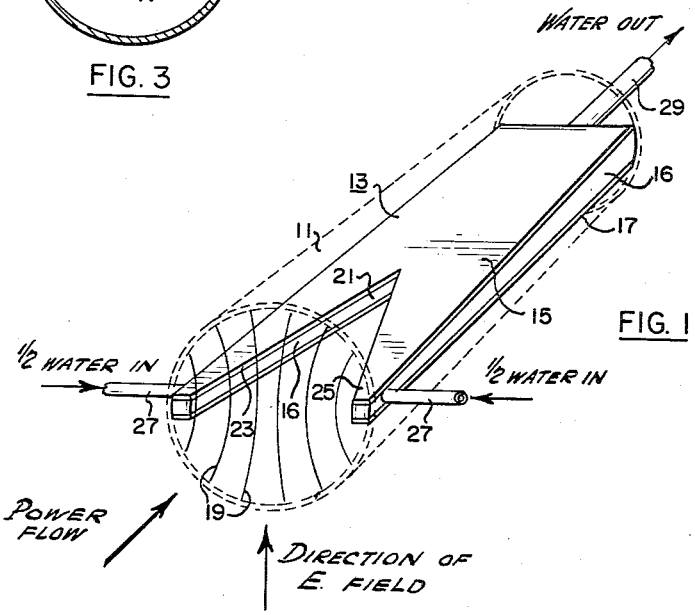
Fig. 1 is a view in perspective of the calorimeter element of this invention. The element is positioned in a wave guide section shown in a phantom view.
Figure 2:
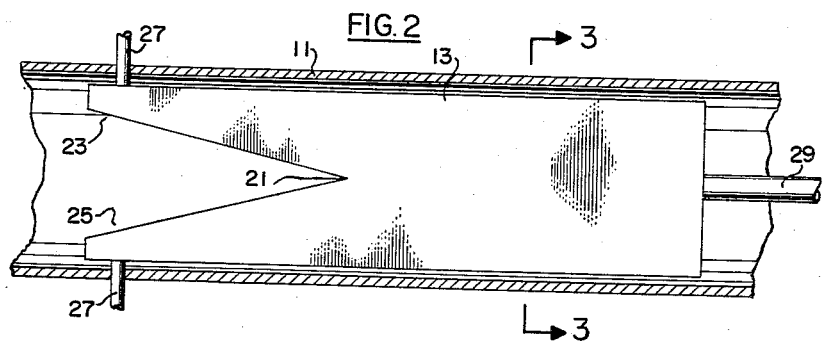
Fig. 2 is a plan view, partially in section, of the apparatus of Fig. 1.

Referring now to the drawings, the reference numeral 11 designates a wave guide having a circular cross section. Electromagnetic energy is transmitted through the wave guide section 11 from the front toward the rear as is indicated by the arrow marked "Power Flow" in Fig. 1. The lines 19 indicate the general distribution and direction of the electrical field within the wave guide 11 in the $TE_{1,1}$ mode. This invention, however, is not to be construed as applicable solely to wave guides having circular cross sections.

A container 13, formed of dielectric sheet material which is transparent to high frequency electromagnetic energy, such as sheet plastic, plate glass or the like, is positioned within the wave guide 11 and comprises a top wall 15, side walls 16, and a bottom wall 17. The inner sides of the top wall 15 and of the bottom wall 17 are sloped with respect to each other and are closest at the front end and diverge from one another as they extend toward the rear end of the wave guide 11. The angle of the slope matches the contents of the container 13 to the wave guide section 11. The container 13 is disposed centrally in the wave guide 11 with its side walls 16 generally parallel to the electrical field, and with its top and bottom walls 15 and 17 approximately parallel to the longitudinal axis of the wave guide section 11. The walls 15, 16 and 17 of the container are spaced from the walls of the wave guide 11.

The front end of the container 13 has a V-shaped reentrant portion 21 forming two legs 23 and 25, each of which communicates with an inlet tube 27 formed of thermal insulating material. Water or any other lossy liquid is pumped into the inlet tubes 27, fills the container 13, and passes out through an outlet tube 29 at the rear end of the container 13. Approximately one-half of the liquid enters through each of the inlet tubes 27.

In operation, the liquid is pumped through the container 13 at a constant rate of flow. As the electromagnetic energy traverses the container 13, the liquid absorbs energy and converts the absorbed electromagnetic energy into heat. After the temperatures of the entering and leaving liquid have become stabilized, the power flowing through the wave guide 11 may be determined by one of at least two methods.

The power absorbed by the liquid in the container 13 may be determined from the rate of flow of the liquid and the temperature rise of the liquid due to exposure to the electromagnetic field. The amount of heat carried away by the flowing liquid is an indication of the amount of power flowing through the wave guide 11.

A second method is the substitution method wherein either direct or low frequency (60 cycle) power is substituted for the high frequency power to heat, through the medium of an external heater, the liquid passing through the container 13. When the liquid is heated to the same conditions by the low frequency power as it was by the high frequency power, the amount of direct or low frequency power is the same as the amount of high frequency power absorbed by the water. This amount of direct or low frequency power is readily measured.

Tests have shown that if the average thickness of the liquid in the housing 13 beyond the reentrant portion 21 is at least ⅙ the diameter of the wave guide 11, one-half of the available energy in the wave guide 11 is absorbed by each section of the housing of a length equal to the diameter of the wave guide 11. By supplying the liquid to the container 13 in approximately equal amounts through the two inlet tubes 27, the liquid in the container 13 is maintained in constant movement and well mixed, preventing stagnant liquid on either side of the reentrant portion 21. Stagnant liquid tends to become hot. This is objectionable because its dielectric constant varies with temperature.

Since the contents of the container 13 is matched to the wave guide section 11, it is broadband, that is, it will act as a resistance and absorb the same proportion of energy per unit length at any frequency which can be readily transmitted through the wave guide 11. In addition, the liquid capacity of the container 13 is small so that the radiation of heat from the small quantity of liquid is at a minimum. The losses by conduction of the container 13 to the wave guide 11 are small because the container 13 is substantially surrounded by a layer of air or other gas and does not contact the wave guide 11 at any point, and because the tubes 27 and 29 and any supports for the container 13 are of thermal insulating material such as glass or plastic. By using the substitution method of determining the amount of power necessary to heat the liquid to the same conditions as the high frequency energy, the effect of the radiation and conduction losses are substantially eliminated.

The calorimeter load of this invention is simple in construction and positive in its functioning. It is suitable for different sizes of transmission elements and different levels of power transmission. The losses are at a minimum, and the accuracy is at a maximum.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the amount of high frequency electromagnetic energy flowing through a waveguide conduit which comprises a container formed of dielectric material and having spaced and generally flat top and bottom walls interconnected along the outer edges providing a liquid tight enclosure, said top and bottom walls gradually diverging from one end to provide a narrow inlet end and a relatively wider outlet end, said container being positioned longitudinally within and in spaced relation with wall structure of the waveguide conduit to permit electromagnetic energy flowing through the waveguide conduit to traverse the container walls from the inlet end to the outlet end, conduit means in communication with the inlet end of the container for the supply of a lossy liquid and conduit means in communication with the outlet end of the container providing for circulation of liquid through the container while preventing stagnation of the liquid within the container whereby electromagnetic energy is absorbed and converted into heat as a measurement of the amount of electromagnetic energy flowing through the waveguide.

2. Apparatus as in claim 1, further characterized by the upper and lower walls of the container being formed with triangular cutouts, each cutout having its apex spaced from the inlet end of the container forming the inlet end of the container into a pair of independent leg portions, each leg portion having an independent inlet conduit for the simultaneous supply of the lossy liquid to each leg portion and provide for circulation of the liquid through the outlet conduit while preventing stagnation of the liquid within the container.

References Cited in the file of this patent

UNITED STATES PATENTS

| 2,463,428 | Rieke | Mar. 1, 1949 |
| 2,560,536 | Althouse | July 17, 1951 |
| 2,676,307 | Anderson | Apr. 20, 1954 |

FOREIGN PATENTS

| 669,250 | Great Britain | Apr. 2, 1952 |